(12) United States Patent
Tvete et al.

(10) Patent No.: US 7,680,142 B1
(45) Date of Patent: Mar. 16, 2010

(54) COMMUNICATIONS CHIP HAVING A PLURALITY OF LOGIC ANALYSERS

(75) Inventors: Knut Tvete, Lovenstad (NO); Hans Rygh, Oslo (NO); Bjorn Dag Johnsen, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 1206 days.

(21) Appl. No.: 10/843,193

(22) Filed: May 11, 2004

(51) Int. Cl.
*H04L 12/54* (2006.01)
*H04J 3/02* (2006.01)

(52) U.S. Cl. ...................... 370/429; 370/537
(58) Field of Classification Search ................. 370/429, 370/537; 702/67; 714/43
See application file for complete search history.

(56) References Cited

U.S. PATENT DOCUMENTS 6,850,852 B1 * 2/2005 Ferguson et al. ............. 702/67

2001/0055323 A1 * 12/2001 Rowett et al. ............... 370/537
2003/0131288 A1 * 7/2003 Takahashi et al. ............ 714/43

\* cited by examiner

*Primary Examiner*—Kevin C Harper
*Assistant Examiner*—Wanda Z Russell
(74) *Attorney, Agent, or Firm*—Park, Vaughan & Fleming LLP (57) ABSTRACT

A communications chip having a plurality of ports. Each port is provided with an interface for attachment to an external communications facility to exchange data traffic. There is also a switching matrix for routing data traffic on the chip between the ports. The chip further includes a plurality of logic analyzers. Each logic analyzer is associated with a corresponding one of the ports. Each logic analyzers is operable to monitor data traffic passing through its corresponding port and to trigger on one or more predetermined conditions relating to the monitored data traffic. The chip further includes a control interface to allow reconfiguration of the predetermined conditions for at least one of the logic analyzers.

25 Claims, 10 Drawing Sheets

COMMUNICATIONS CHIP HAVING A PLURALITY OF LOGIC ANALYSERS

FIELD OF THE INVENTION

The present invention relates to a communications chip, and in particular to a communications chip having a plurality of logic analysers thereon.

BACKGROUND OF THE INVENTION

One conventional way of testing semiconductor devices such as communications chips is to use a logic analyser, which is an external system that connects to certain data paths, typically via preallocated pin connections. The logic analyser can then be used to investigate whether or not the chip is performing correctly by intercepting data flows to and from the chip, and also potentially by injecting certain data into the chip. However, in doing so the analyser probes load the transmission media, and so can destroy the signals. In addition, as semiconductor devices such as communications chips incorporate higher and higher densities of components and operate at ever-rising frequencies, it is becoming increasingly difficult to use such a conventional logic analyser.

SUMMARY OF THE INVENTION

Accordingly, one embodiment of the invention provides a communications chip comprising a plurality of ports, each port providing an interface for attachment to an external communications facility to exchange data traffic therewith; a switching matrix for routing data traffic on the chip between the ports; and a plurality of logic analysers. Each logic analyser is associated with a corresponding port and is operable to monitor data traffic passing through this corresponding port and to trigger on one or more predetermined conditions relating to the monitored data traffic. The communications chip further includes a control interface to allow configuration of the one or more predetermined conditions for at least one of the logic analysers.

In one embodiment, at least one logic analyser includes a random access memory (RAM) for storing header data from packets of the monitored data traffic. The logic analyser may further include a timer, thereby allowing a time value to be associated with the stored header data for each of the packets. In one particular embodiment, the control interface can be used to specify selected fields from the packet header data to store into the RAM. In addition, the control interface may be used to specify the maximum number of packets satisfying the one or more predetermined conditions whose header data is stored into RAM.

In one embodiment the one or more predetermined conditions are satisfied by a packet header matching a comparison bit pattern as configured by the control interface. The control interface may be used to configure a mask to be used in the matching and also to specify selected fields of the packet header on which the matching is performed.

In one embodiment, the control interface may be used to select between multiple modes of triggering on the one or more predetermined conditions. In one particular embodiment, one mode of triggering comprises specifying a first enable condition and a second store condition. Header data is stored by the logic analyser for packets satisfying the second store condition provided a previous packet has satisfied the first enable condition.

In one embodiment, the logic analyser is operable to trigger on an external trigger signal. The external trigger signal may be received from another logic analyser on the same chip, or from some other device external to the chip.

The logic analyser can be used for development testing of the communications chip and/or providing field diagnostics for the communications chip in a production environment.

Another embodiment of the invention provides a method of operating a communications chip having a plurality of ports, where each port provides an interface for attachment to an external communications facility to exchange data traffic therewith. The communications chip further has a switching matrix for routing data traffic on the chip between the ports. The method comprises providing a plurality of logic analysers on the chip, each logic analyser being associated with a corresponding one of the ports, and monitoring with each logic analyser data traffic passing through its corresponding port. The logic analyser triggers upon one or more predetermined conditions relating to the monitored data traffic, where the conditions for at least one of the logic analysers can be configured via a control interface on the communications chip.

It will be appreciated that the method embodiments of the invention will generally benefit from the same particular features as the chip embodiment of the invention described above.

BRIEF DESCRIPTION OF THE DRAWINGS

Specific embodiments of the present invention will now be described by way of example only with reference to the accompanying figures in which.

DETAILED DESCRIPTION

The Infiniband architecture provides a standard computer networking environment defined and administered by the Infiniband Trade Association, which was founded by Compaq, Dell, Hewlett-Packard, IBM, Intel, Microsoft and Sun Microsystems (Infiniband is a trademark of the Infiniband Trade Association; other names are trademarks of their respective companies). The Infiniband Architecture defines a System Area Network (SAN) for connecting multiple independent processor platforms (i.e., host processor nodes), I/O platforms and I/O devices. A full definition of the Infiniband Architecture may be found in the Infiniband Architecture Specification Volumes 1 and 2, available from the Infiniband Trade Association, and which is hereby incorporated by reference.

An Infiniband Architecture system area network (SAN) provides a communications and management infrastructure supporting both I/O and interprocessor communications for one or more computer systems. An Infiniband Architecture system can range from a small server with one processor and a few I/O devices to a massively parallel supercomputer installation with hundreds of processors and thousands of I/O devices.

The Infiniband Architecture defines a switched communications fabric allowing many devices to communicate concurrently with high bandwidth and low latency in a protected, remotely managed environment. An end node can communicate over multiple Infiniband Architecture ports and can utilise multiple paths through the Infiniband Architecture fabric. A multiplicity of Infiniband Architecture ports and paths through the network are provided both for fault tolerance and for increased data transfer bandwidth.

Figure 1:
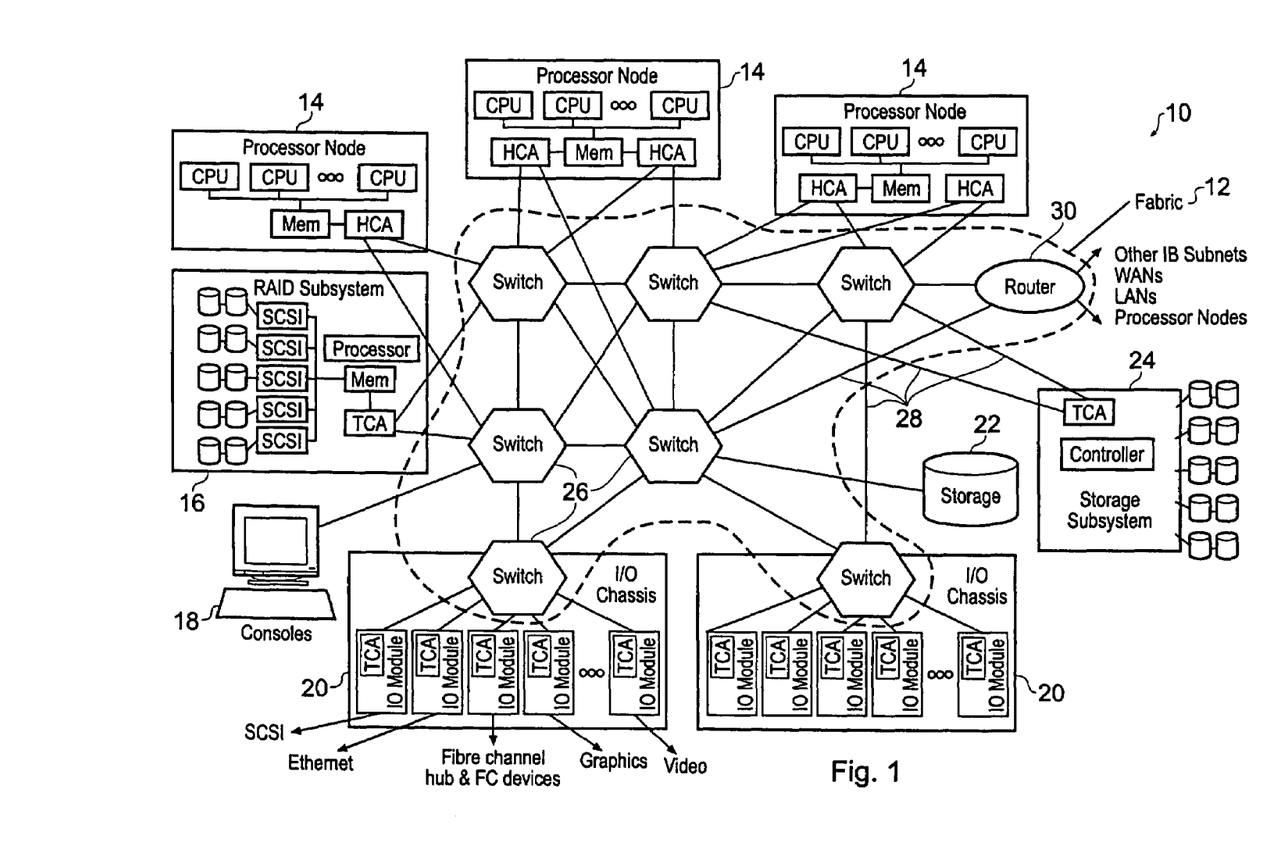
FIG. 1 is a schematic block diagram showing an example of interconnection of computing system elements via the Infiniband networking architecture.

An example of an Infiniband Architecture system area network is shown in FIG. 1. As can be seen from FIG. 1, the system area network 10 comprises an Infiniband Architecture fabric (or subnet) 12 made up of cascaded switches and routers. The fabric 12 provides links between a number of processor nodes 14 and other nodes including a RAID subsystem 16, consoles 18, I/O chassis 20, storage 22 and a storage subsystem 24. The fabric 12 comprises a plurality of switches 26 with Infiniband links 28 providing data connections between the switches 26 and between the nodes attached to the fabric 12. Also included in the fabric 12 is a router 30 for providing connections to and from other networks, which may be other Infiniband Architecture subnets, non-InfinibandArchitecture LANs and WANs, and/or processor nodes. I/O units connected via the fabric 12 may range in complexity from single ASIC devices such as a SCSI (Small Computer Systems Interface) or LAN adapter to large memory rich RAID subsystems that rival a processor node in complexity. Collectively, the processor nodes 14, RAID subsystem 16, consoles 18, I/O chassis 20, storage 22 and storage subsystems 24 are known as end nodes 32.

Each end node 32 includes a channel adapter, which may be a Host Channel Adapter (HCA) or a Target Channel Adapter (TCA). Host Channel Adapters are found in processor nodes 14, and Target Channel Adapters are found in I/O nodes 16, 18, 20, 22 and 24. Host Channel Adapters are configured to issue requests across the fabric 12, and Target Channel Adapters are configured to respond to such requests, for example by supplying requested data or storing supplied data.

Each channel adapter uses a queuing system based on Queue Pairs, one queue for send operations and one for receive operations. Each queue pair may therefore be considered to provide a virtual communication port for a channel adapter. Each channel adapter may have up to $2^{24}$ Queue Pairs, which may be assigned individually or in combination to handle communications involving different parts (or consumers) of the end node 32. For example, a processor node 14 may comprise a plurality of processors and each processor may have one or more individual Queue Pairs assigned to handle requests and responses flowing to and from that particular processor of the processor node via fabric 12. Alternatively, or in addition, a processor of a given processor node 14 may be running more than one process and each process may have one or more Queue Pairs assigned to handle requests and responses flowing to and from that process via the fabric 12.

The interconnects 28 may be one of three classes, 1x, 4x or 12x, referring to the number of parallel lanes making up that interconnect. Each lane is a single serial connection over a single physical signal carrier path (whether electrical or optical). Thus the bandwidth available to each interconnect is defined by a combination of the number of lanes and the maximum data rate of the physical signal carrier making up each lane.

Figure 2:
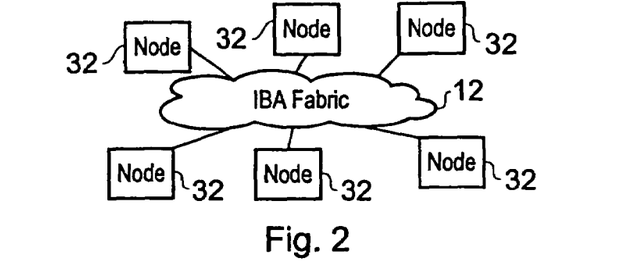
FIG. 2 is a schematic block diagram of a simplified arrangement of an Infiniband Architecture system.
Figure 3:
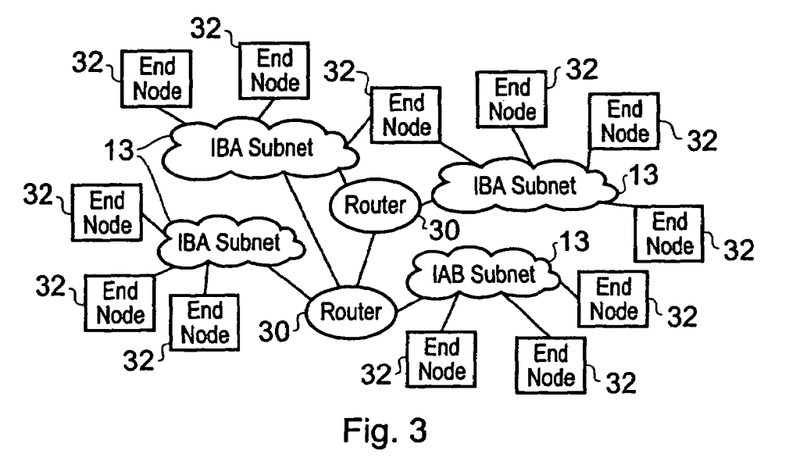
FIG. 3 is a schematic block diagram of another simplified arrangement of an Infiniband Architecture system.
Figure 4:
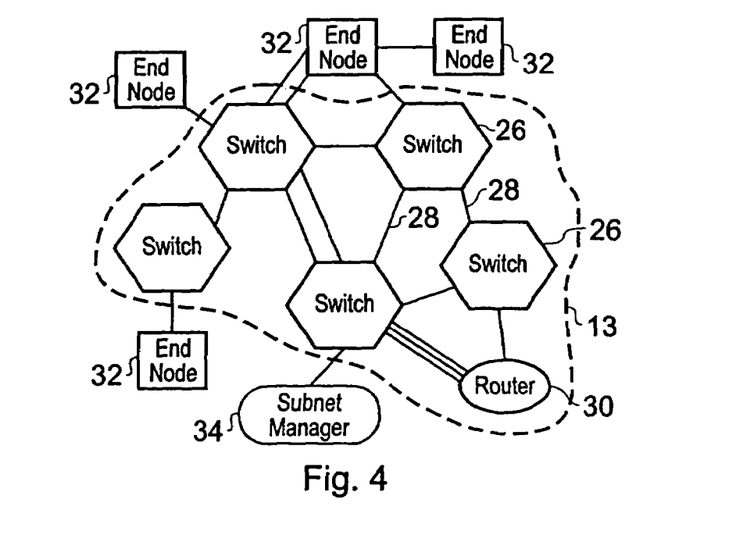
FIG. 4 is a schematic block diagram of a further simplified arrangement of an Infiniband Architecture system.

Examples of possible Infiniband Architecture topologies are shown in FIGS. 2, 3 and 4. FIG. 2 shows a high level simplified topology example where a number of end nodes 32 are interconnected by the fabric 12. An Infiniband Architecture network may be subdivided into subnets 13 interconnected by routers 30 as illustrated in FIG. 3. Any particular end node 32 may be attached to a single subnet 13 or to multiple subnets 13. Shown in FIG. 4 is an example of the structure of a subnet 13. The subnet 13 comprises end nodes 32, switches 26, routers 30 and subnet managers 34 interconnected by links 28. Each end node 32 may attach to a single switch 26, multiple switches 26 and/or directly with each other. In the case of a direct connection between end nodes 32, the two or more directly linked end nodes form in effect an independent subnet with no connectivity to the remainder of the devices attached to the main subnet, and one of the interconnected end nodes functions as the subnet manager for that link.

Figure 5:
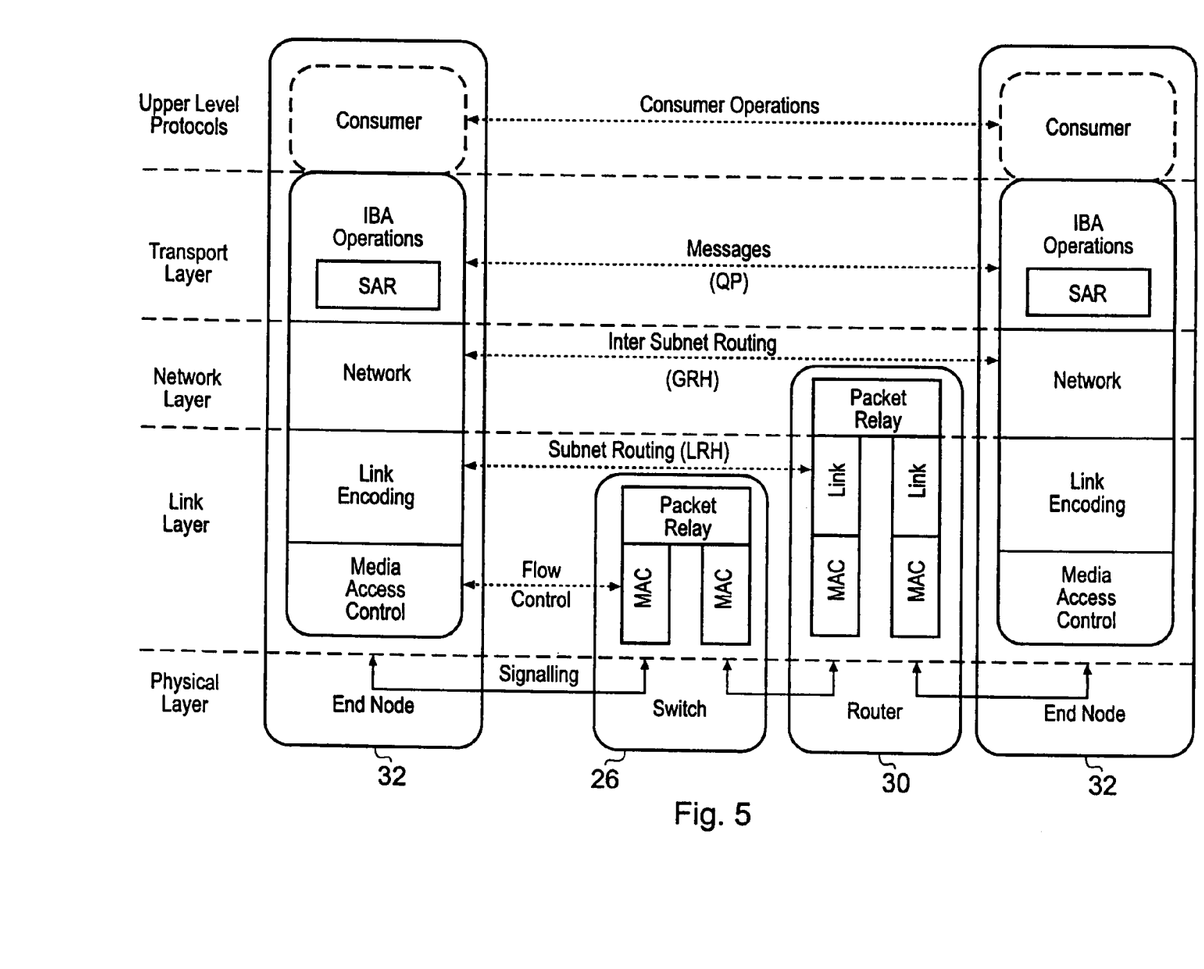
FIG. 5 is a schematic illustration of the layers of an Infiniband Architecture system.

Referring now to FIG. 5, there is shown an illustration of the architecture layers of an Infiniband Architecture system. Starting with the physical layer, this specifies how bits are placed onto the interconnections 28 and defines the symbols used for framing (i.e., start of packet and end of packet), data, and fill between packets (idles). It also specifies the signalling protocol as to what constitutes a validly formed packet (i.e., symbol encoding, proper alignment of framing symbols, no invalid or non-data symbols between start and end delimiters, no disparity errors, synchronisation method, etc.). The signalling protocol used by the Infiniband Architecture utilises a differential signal. The interconnects 28 between nodes of an Infiniband Architecture network are normally provided by electrical signal carriers such as copper cables or optical signal carriers such as optical fibres. As discussed above, the maximum data rate of the interconnect is limited by the bandwidth of the selected channel. The physical layer also includes de-skewing circuitry for compensating for skew latency in the channels.

Figure 6:
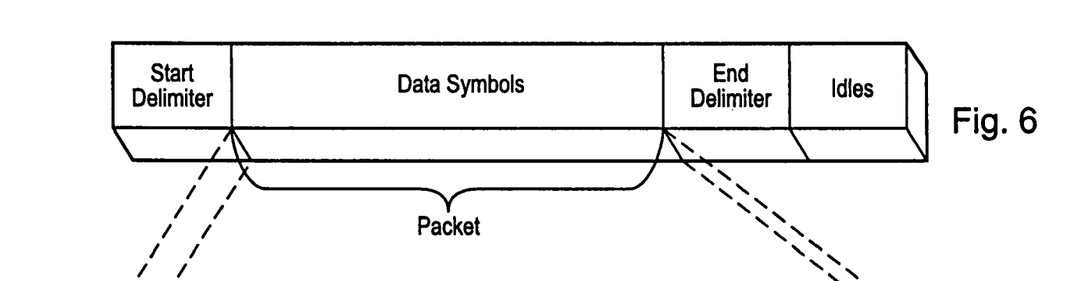
FIG. 6 shows schematically the structure of a message to be transmitted via an Infiniband Architecture system.

The structure of a message to be transmitted through the fabric 12 via the interconnections 28 is illustrated in FIG. 6. As can be seen from FIG. 6, the message comprises a start delimiter, a packet comprising data symbols, an end delimiter and a number of idles.

Figure 7:
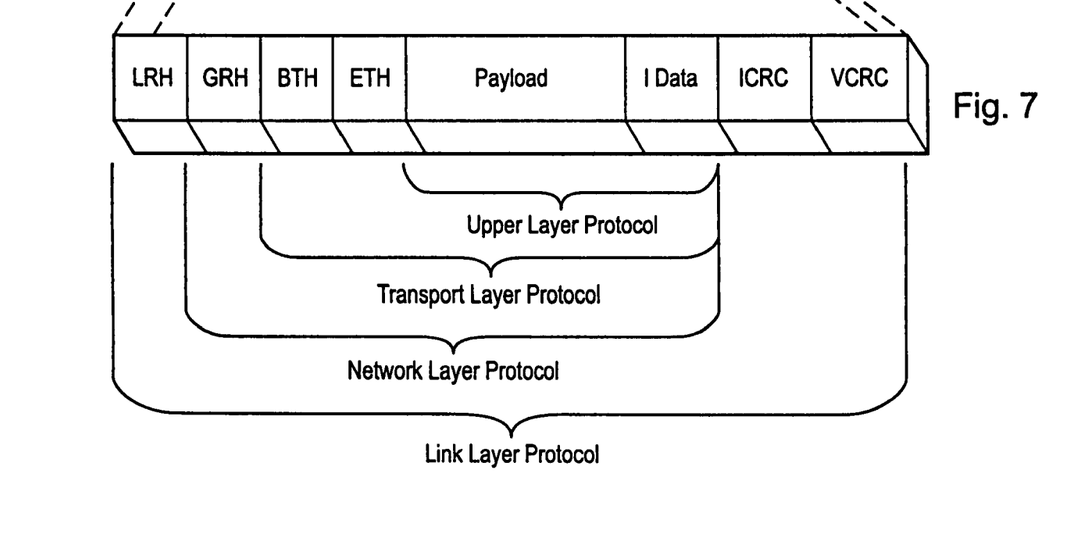
FIG. 7 shows schematically the format of a packet of the message of FIG. 6.

The data packet format is illustrated in FIG. 7. Packets may be one of two types, IBA (Infiniband Architecture) Packets or RAW (non-Infiniband Architecture) Packets. IBA Packets have IBA defined transport headers, are routed on Infiniband Architecture fabrics 12, and use native Infiniband Architecture transport facilities. Raw Packets may be routed on IBA fabrics but do not contain Infiniband Architecture transport headers. From an Infiniband point of view, these packets contain only Infiniband routing headers, payload and CRC. The Infiniband Architecture does not define the processing of these packets above the link and network layers. These packets can be used to support non-Infiniband Architecture transports (e.g. TCP/IP, IPX/SPX, NetBEUI, etc.) over an Infiniband fabric.

The link layer describes the packet format and protocols for packet operation (e.g., flow control and how packets are routed within a subnet between the source and the destination). Packets may be data packets that convey data between end nodes and comprise a number of different headers which may or may not be present. Alternatively, packets may be Link Management Packets, which are used to train and maintain link operation. These packets are used to negotiate operational parameters between the ports at each end of a link such as bit rate, link width, etc. The link layer is responsible for flow control handling to prevent the loss of packets due to buffer overflow by the receiver at each end of a link. This mechanism does not describe end to end flow control such as might be utilised to prevent transmission of messages during periods when receive buffers are not posted.

The terms "transmitter" and "receiver" are utilised to describe each end of a given link. The transmitter is the node sourcing data packets. The receiver is the consumer of the data packets. Each end of the link has a transmitter and a receiver. The Infiniband Architecture utilises an "absolute" credit based flow control scheme, in which Infiniband Architecture receivers provide a "credit limit". A credit limit is an indication of the total amount of data that a transmitter has been authorised to send since link initialisation.

Credit control is performed by a media access control (MAC) protocol. With respect to a given link, a receiver advertises (by means of a link packet) that credit is available, the amount of which is based on the current status of the receiver's receive buffers. The transmitter receives the link packet and determines how much transmit credit is available from the contents of the link packet. The transmitter then assigns itself the available credit and transmits data packets to the receiver while simultaneously decrementing its available credit count. The transmitter calculates its remaining available credit based on the initial figure determined from the receiver link packet and a record of how much data it has transmitted since that link packet was received.

Errors in transmission, in data packets, or in the exchange of flow control information can result in inconsistencies in the flow control state perceived by the transmitter and receiver. The Infiniband Architecture flow control mechanism provides for recovery from this condition. The transmitter periodically sends an indication of the total amount of data that it has sent since link initialisation. The receiver uses this data to re-synchronise the state between the receiver and transmitter.

As can be seen in FIG. 7, the link layer adds a Local Route Header (LRH) to the front of the packet and adds Invariant and Variant Cyclic Redundancy Checks (ICRC and VCRC) to the end of the packet. The Local Route Header is always present and identifies the local source and local destination where switches 26 will route the packet. The Invariant Cyclic Redundancy Check covers all fields within the packet which do not change as the message traverses the fabric. The Variant Cyclic Redundancy Check covers all the fields of the packet. The combination of the two CRCs allows switches 26 and routers 30 to modify appropriate fields and still maintain data integrity for the transport control and data portion of the packet.

The network layer, which is present only within routers 30 and end nodes 32, describes the protocol for routing a packet between subnets 13. Thus a Global Route Header (GRH) is present in a packet that traverses multiple subnets 13. The Global Route Header identifies the source and destination ports of the message. Routers 30 use the contents of the Global Route Header to determine the forwarding requirements of the message. As the message traverses different subnets 13 the routers 30 modify the content of the Global Route Header and replace the Local Route Header, but the source and destination port identities are not changed and are protected by the Invariant Cyclic Redundancy Check. Thus the network and link layers operate together to deliver a packet to the desired destination.

The transport layer, which is present only within end nodes 32, delivers the packet to the proper Queue Pair within the channel adapter of the destination end node 32 and instructs that Queue Pair as to how the packet's data should be processed. The transport layer also has responsibility for segmenting a message into multiple packets when the message's data payload is greater than the maximum payload that can be carried by a single packet. The receiving Queue Pair then reassembles the data from the multiple packets at the destination end node 32. The transport layer adds up to two headers to the packet. The Base Transport Header (BTH) is present in all IBA Packets but not in RAW Packets. It identifies the destination Queue Pair and indicates an operation code, packet sequence number and specifies the operation (Send, Read, Write, etc.). A number of Extended Transport Headers (ETH) may be present, conditional on the class of service and operation code.

The Packet Sequence Number is initialised for a given Queue Pair as part of the communications establishment process and increments each time that Queue Pair creates a new packet. The receiving Queue Pair tracks the received Packet Sequence Number to determine whether any packets have been lost. For reliable service, the receiver end node 32 may transmit an acknowledgement signal back to the originator end node to indicate whether all packets have been received successfully.

The upper level protocols are completely software-based and may comprise any number of protocols used by various user consumers. The payload is the data carried by the packet and I Data is handling data associated with a work activity to be performed on the payload. Also present in the upper level protocols are Subnet Management and Subnet Services protocols. These protocols provide management structure including management messages for management of the subnet 13. Each subnet 13 requires only a single Subnet Manager application 34 which may be present in a dedicated node (as illustrated in FIG. 4) or may reside in another node, including a switch 26 or a router 30 as well as an end node 32.

Figure 8:
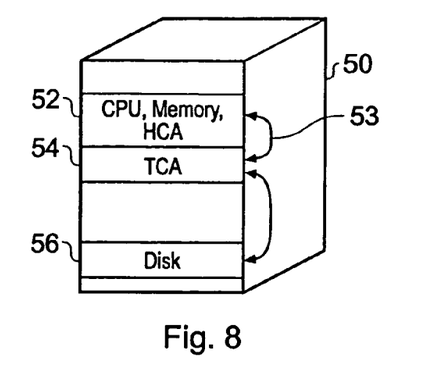
FIG. 8 is a schematic block diagram showing an arrangement where the Infiniband Architecture is used to interconnect components within a computer system.
Figure 9:
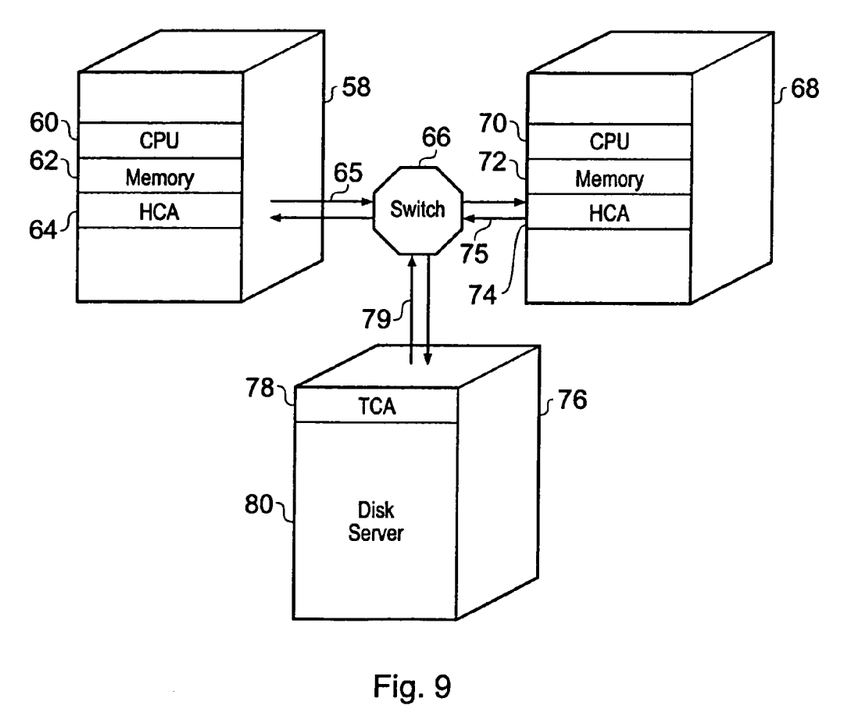
FIG. 9 is a schematic block diagram showing an arrangement where the Infiniband Architecture is used as an interconnect between computer systems.

Examples of simple Infiniband Architecture systems are shown in FIGS. 8 and 9. FIG. 8 shows an arrangement where the Infiniband Architecture is used to interconnect components within a standard computer system rack 50. In this example, the CPU, memory and a Host Channel Adapter 52 are interconnected using conventional non-Infiniband Architecture techniques. The Host Channel Adapter 52 of the CPU and memory communicate via an Infiniband Architecture interconnect 53 with a Target Channel Adapter 54. The Target Channel Adapter 54 communicates with a disk drive unit 56 via a SCSI (Small Computer System Interface) connection.

Thus the Infiniband Architecture is configured in this example to facilitate communications between elements of the same computer system.

FIG. 9 shows an arrangement where the Infiniband Architecture is used only as an interconnect between computers. In this example a first computer system is mounted in a rack 58 and comprises a CPU 60, memory 62 and a Host Channel Adapter 64 interconnected via non-Infiniband Architecture techniques. Via the Host Channel adapter 64, the first computer system communicates to and from a switch 66 across interconnects 65. Also connected to the switch 66 is a second computer system mounted in a rack 68 and comprising a CPU 70, memory 72 and a Host Channel Adapter 74, which connects to the switch 66 via interconnects 75.

Data storage for the first and second computer systems is provided by a disk server 80 mounted in a rack 76. The disk server 80 connects with a Target Channel Adapter 78 also mounted within the rack 76 by non-Infiniband Architecture techniques. The Target Channel Adapter 78 connects to the switch 66 via interconnects 79. Thus the Infiniband Architecture is configured in this example to facilitate communication between more than one distinct computer system. The techniques shown in FIGS. 8 and 9 may be employed in combination with one another, for example a computer system using the Infiniband Architecture for internal communications may also be connected to other computer systems via a network based on the Infiniband Architecture.

Figure 10:
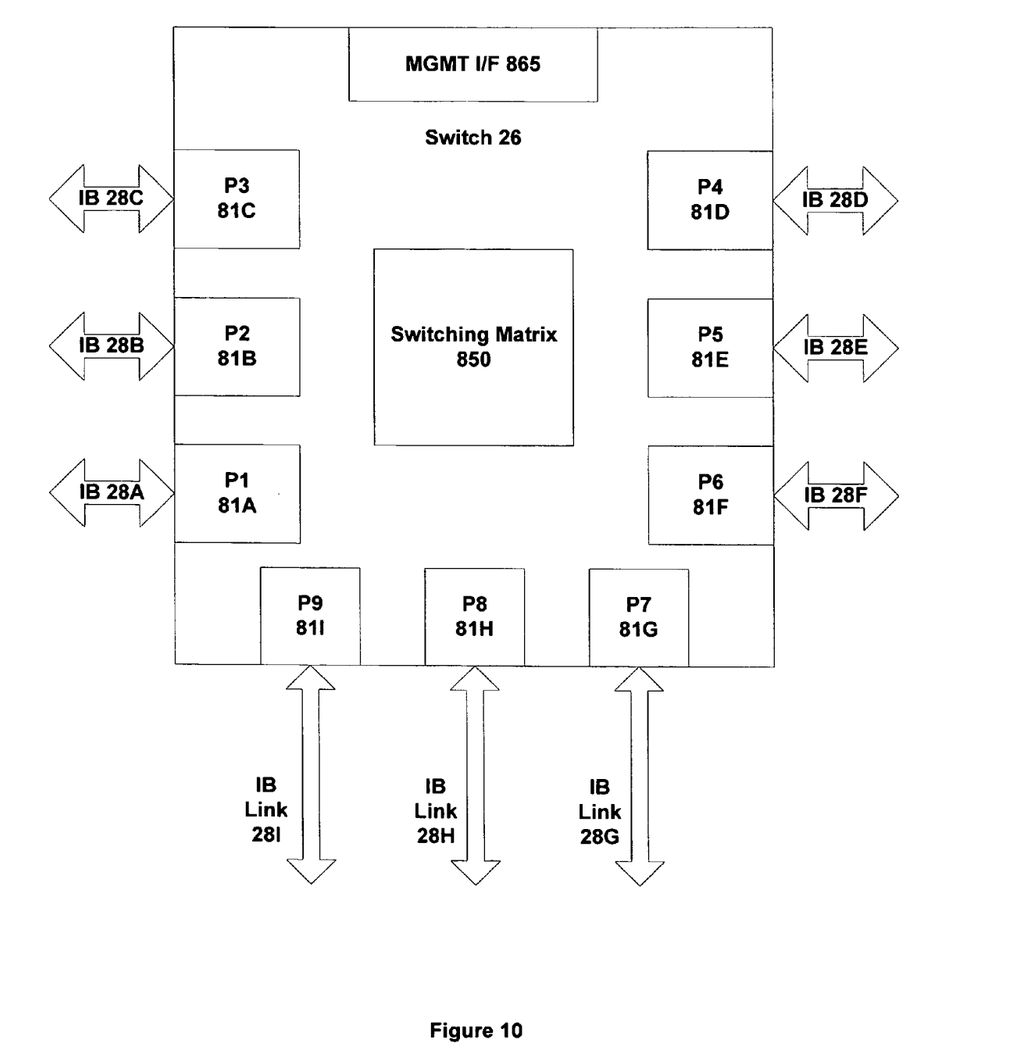
FIG. 10 is a schematic block diagram showing a switch for use in an Infiniband network in accordance with one embodiment of the invention.

FIG. 10 illustrates a switch 26 for use in fabric 12 in accordance with one embodiment of the invention. Switch 26 is implemented as a semiconductor device, for example an application specific integrated circuit (ASIC), and includes a management control interface 865, multiple ports 81, and a switching matrix 850. The management interface 865 provides access to the switch 26 for one or more external control systems, and can be used to configure switch 26 as appropriate depending upon the circumstances.

In the embodiment illustrated in FIG. 10, switch 26 has nine ports 81, denoted in FIG. 10 as P1 81A, P2 81B, P3 81C, P4 81D, P5 81E, P6 81F, P7 81G, P8 81H, and P9 81I. Each port is attached to a corresponding Infiniband duplex link 28 providing transmit (Tx) and receive (Rx) capability. The basic data rate of a link into a port is 2.5 GHz. However, in one embodiment, the ports are able to accept one, four or twelve such 2.5 GHz links, so that switch 26 can provide connectivity for a total of 96 (9×12) 2.5 GHz links. Each of these links 28 can be flow controlled using a credit-based link level flow control, as described above.

In accordance with the Infiniband Architecture, each link 28 can be subdivided into a maximum of sixteen virtual lanes. The first fifteen virtual lanes support general purpose data communications, while the remaining virtual lane (denoted VL15) is used for special management purposes. Note that virtual lane VL15 is not flow controlled, and so should be considered as not reliable. In one embodiment of the invention, the switch 26 supports four virtual lanes for general data communication for each link, plus one virtual lane for management purposes (i.e., VL15).

The Infiniband Architecture also provides quality of service (QoS) controls. These are implemented by allowing a particular service level (SL) to be specified at the virtual lane level, so that each VL on a physical link may be allocated its own SL.

The Infiniband Architecture supports the concept of partitioning in order to provide logical isolation of components sharing the same subnet. All nodes included in a route from a source to a destination must share the same partition key, otherwise they are unable to communicate with one another (or even to recognise each other's existence). All communications within a given virtual lane belong to a single partition. An individual node may support multiple partition keys, and so belong to multiple different partitions.

Each port 81 on switch 26 is provided with an input buffer (not shown in FIG. 10). The input buffer receives data arriving at a port 81 over its respective link 28, and stores this data pending transfer through the switching matrix 850. In the embodiment mentioned above, each input buffer is divided into four partitions, corresponding to the four virtual lanes on the associated link 28. This ensures that data from different partitions is kept properly isolated.

Switching matrix 850 is used to transport data from one port to another. For example, if data arrives on link 28D at port P4 81D and is to be forwarded on link 28A, then switching matrix 850 is responsible for transferring the data from port P4 81D to port P1 81A (corresponding to link 28A). It will be appreciated that while ports 81 are constrained by the Infiniband standard (in order to ensure network connectivity), to some extent switching matrix 850 can be regarded as a more generic switching device, since it is internal to switch 26 and therefore shielded (at least in part) from other network devices.

The Infiniband architecture supports two general modes of communication. The first of these is unicast, or point-to-point, in which each data packet goes from a single source to a single destination. This translates into switching matrix 850 transferring a packet from one incoming port to one outgoing port. The other mode of communication in Infiniband is multicast, in which a packet may be routed from a single source to multiple destinations. This is mirrored in the passage of the packet through switching matrix 850, whereby a packet from an incoming port may be directed to multiple outgoing ports.

It is desirable for the switch 26 to have low latency and high efficiency. A low latency implies relatively small amounts of buffering, otherwise delays through the switch will tend to increase. A high efficiency implies that the performance of the switch 26 is not degraded due to competition for resources within the chip as the load (i.e., the traffic through the switch) rises.

Figure 11:
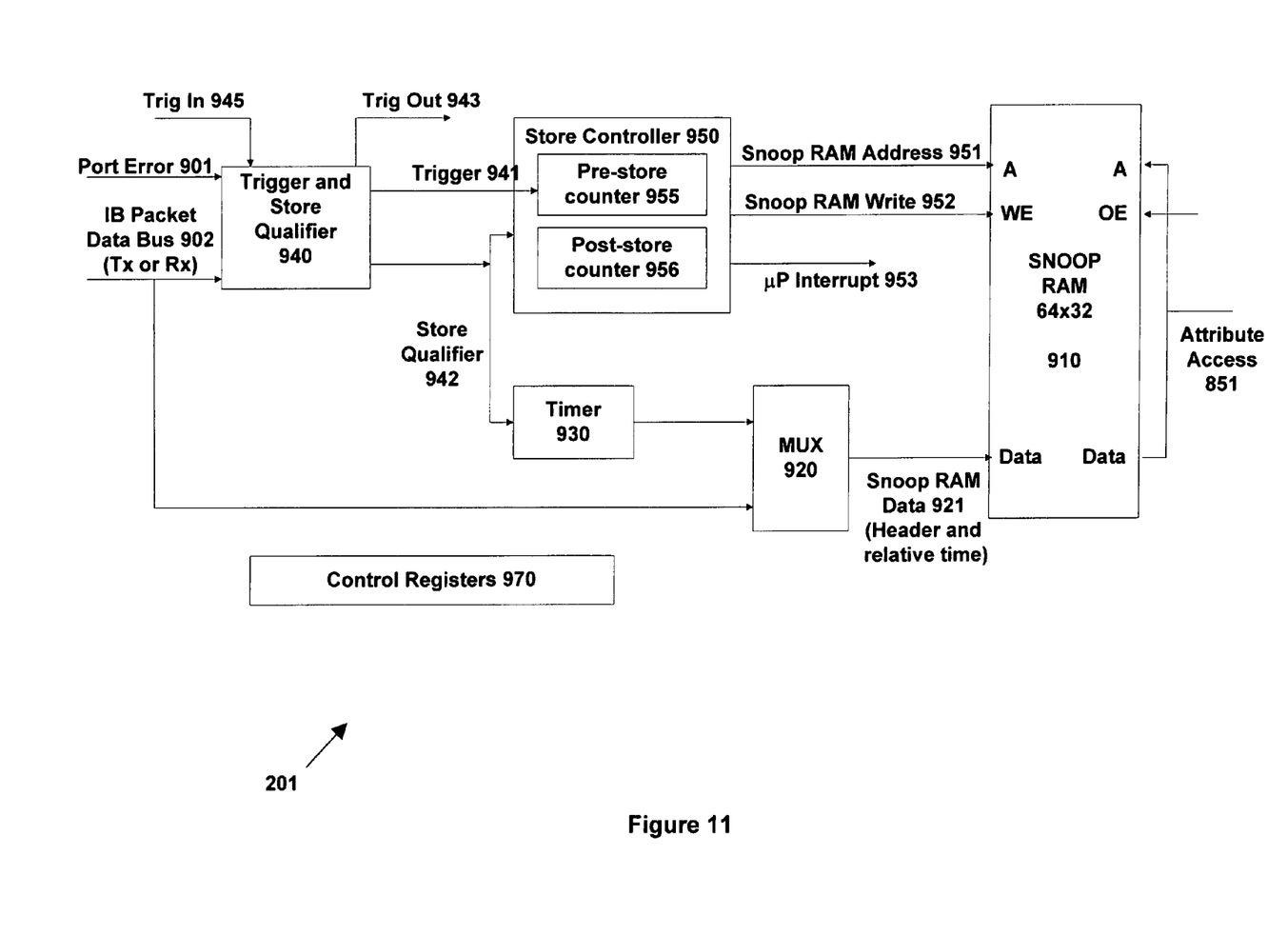
FIG. 11 is a schematic block diagram of a logic analyser incorporated into a port in accordance with one embodiment of the invention.

FIG. 11 provides a schematic block diagram of a logic analyser 201, which is incorporated into each port 81 of switch 26 in accordance with one embodiment of the invention. The logic analyser can be used to sample (snoop) selected data from packets that are being transmitted from (Tx) or received into (Rx) the relevant port on data bus 902. The logic analyser 201 includes a snoop RAM 910, a multiplexer 920, a timer 930, a trigger and store qualifier logic unit 940, and a store controller 950. In one embodiment, the logic analyser 201 supports various modes of operation, which are selected by entering appropriate settings into two control registers 970 via the management interface 865. (Note that for clarity, certain aspects of a routine nature are omitted from FIG. 11, such as the various connections between control registers 970 and the remaining components of logic analyser 201, where the need for and implementation of such features would be readily apparent to a person of ordinary skill in the art).

The trigger and store qualifier logic unit 940 determines when the logic analyser samples packet data. In one embodiment there are three available mechanisms to initiate this sampling:

1. An external trigger over line 945. This external trigger may come from another logic analyser on the same switch unit 26, or it may originate from a device separate from switch unit 26, such as another switch unit, or some form of external test apparatus (see FIG. 12 below).

2. A port error over line 901. This trigger is raised when the port incorporating the logic analyser detects some error in the packet data. Such an error may be caused by a packet having an incorrect partition key for the virtual lane. Other embodiments may support the detection of additional types of error, for example an ECC error on incoming data.

3. A (selected) match of the Infiniband packet on data bus 902 against a comparison test pattern. This is referred to herein as event triggering.

In one embodiment, the comparison test pattern used for event triggering is a 7×16 bit data structure having the format set out in Table 1 below.

TABLE 1

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Destination Local ID | | | | | | | | | | | | | | | |
| Source Local ID | | | | | | | | | | | | | | | |
| S | | OpCode[5:0] | | | | | | VL | | | | SL | | | |
| Partition Key | | | | | | | | | | | | | | | |
| Destination QP[15:0] | | | | | | | | | | | | | | | |
| PSN[23:16] | | | | | | | | Destination QP[23:16] | | | | | | | |
| PSN[15:0] | | | | | | | | | | | | | | | |

Note that the parameters in the comparison test pattern of Table 1 correspond generally to fields in an Infiniband packet header, such as virtual lane (VL) and packet sequence number (PSN). In particular, the fields specified in Table 1 come from the Local Route Header (LRH) and the Base Transport Header (BTH) mentioned earlier (although they are not necessarily contiguous therein), and accordingly will be well-known to the person of ordinary skill in the art.

In one embodiment, matching against the comparison test pattern of Table 1 is subject to a 16-bit mask having the definition set out in Table 2 below.

TABLE 2

| 0 | Mask DLID |
|---|---|
| 1 | Mask SL |
| 2 | Mask VL |
| 3 | Mask SLID |
| 4 | Mask Pkey |
| 5 | Mask SE |
| 6 | Mask OpCode |
| 7 | Mask DQP |
| 8 | Mask PSN |
| 9 | Negate DLID |
| 10 | Negate SL |
| 11 | Negate VL |
| 12 | Negate SLID |
| 13 | Negate Pkey |
| 14 | Negate OpCode |
| 15 | Negate DQP |

The mask determines whether and how the various portions of the comparison test pattern (as set out in Table 1) are used in matching against the packet data (i.e., the packet stream going through the port containing logic analyser 201 on data bus 902). For example, if bits 1 and 2 in the mask are set, then matching against the comparison test pattern ignores the SL and VL fields (corresponding to bits [7:0] in line 3 of the comparison test pattern) in determining whether or not a match is present. Similarly, if bits 9 and 10 are set, then matching against the comparison test pattern negates the bits in the SL and VL fields prior to performing the match.

Therefore, in order to set up event triggering, a user provides a comparison test pattern having values that are desired to match according to the structure of Table 1, and a mask that controls the conditions associated with this match according to the structure of Table 2. A trigger is then generated as determined by:

$$AND[OR(M(i),XOR(T(i),NOT(XOR(P(i),N(i)))))]$$

where $M(i)$=the mask setting for bit i, $N(i)$=the negate setting for bit i, $T(i)$=the comparison test pattern setting for bit i, and $P(i)$=the packet value for bit i, and where the AND operation is performed across all (7×16=112) values of i corresponding to the bit pattern shown in Table 1. A suitable circuit implementation of the above logical equation can be readily developed by a person of ordinary skill in the art.

In another embodiment, the negate function of Table 2 operates at the field level, rather than on individual bits (as per the above equation). For example, in this embodiment, if bit 9 in Table 2 is set, then the comparison for the DLID field is true, if the DLID in the packet is not equal to the comparison test pattern.

The settings of the control registers 970 within the logic analyser are used to determine which (and how many) trigger mechanisms are active at any given time. In one embodiment, each of the three trigger possibilities listed above (external, port error, and event) can be individually enabled/disabled. In addition, the control registers can also be used to configure whether the triggering is based on Tx or Rx mode (the illustrated embodiment does not support simultaneous monitoring of both Tx and Rx packets, although this could be implemented in other systems if so desired).

Logic unit 940 supports a trigger output 943, which transmits a trigger from unit 940 beyond the port containing logic analyser 201. The trigger output 943 is linked to the logic analysers in other ports on the same switch 26, and also to devices external to switch 26. Logic analyser 201 can be configured using the control registers 970 as to whether or not the trigger output 943 is enabled.

Figure 12:
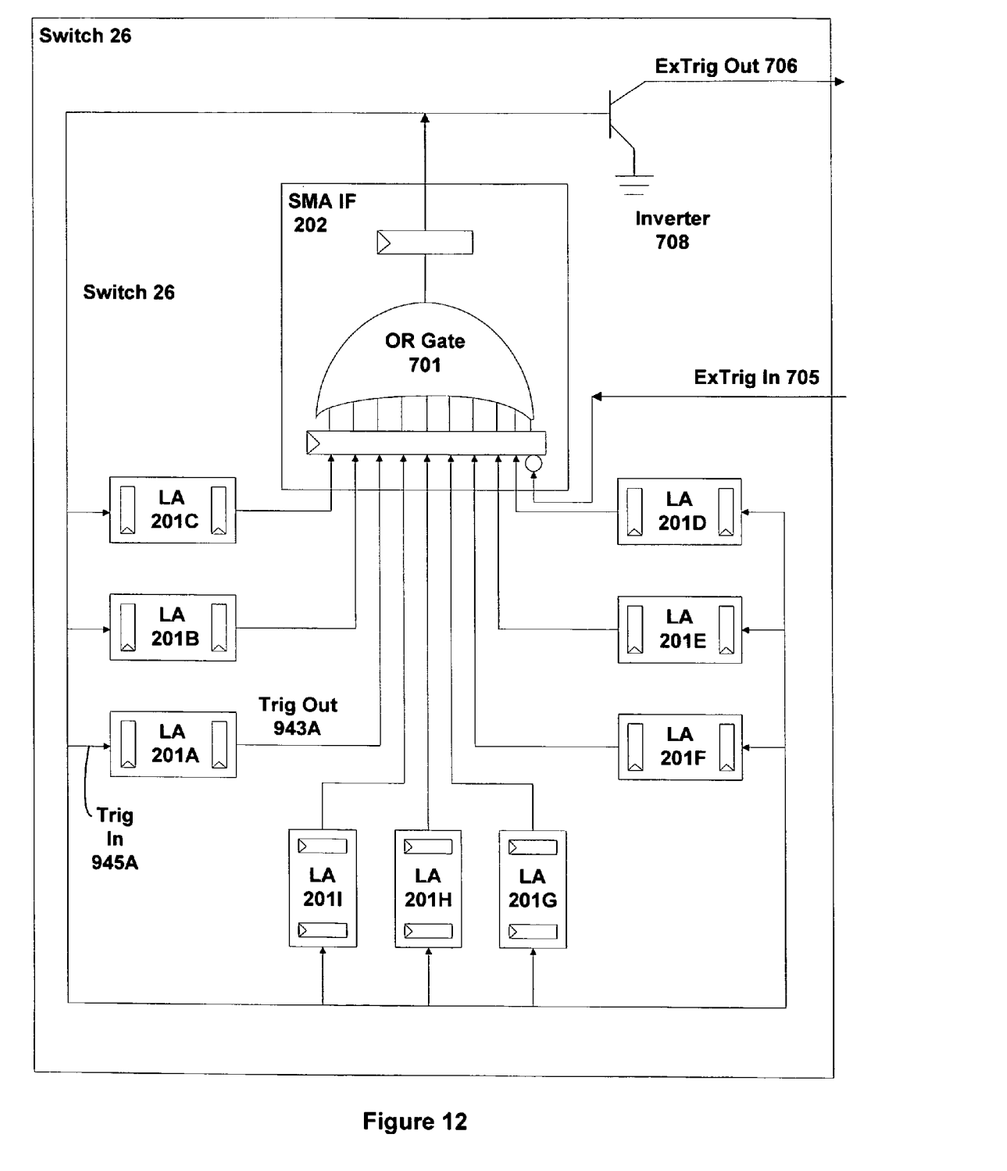
FIG. 12 is a schematic block diagram showing the trigger connections for the switch of FIG. 10 in accordance with one embodiment of the invention.

FIG. 12 illustrates the trigger connections on switch 26 in accordance with one embodiment of the invention. The trigger outputs 943 from each logic analyser are fed to an OR gate 701 located within a subnet management agent interface (SMA IF) 202 on the switch 26. The SMA IF is part of the management interface 865 of the chip (see FIG. 10). The OR gate 701 further receives an off-chip (external) trigger input 705. This may be from another switch, some test control apparatus, or any other appropriate source. Note that external trigger input 705 is inverted prior to OR gate 701. This is because in the particular embodiment illustrated, on-chip trigger signals are active-high, while off-chip trigger signals are active-low.

The output from OR gate 701 forms an external trigger output signal 706, which is passed through inverter 708 to convert the active-high output from OR gate 701 into an active-low form for passing off-chip. The external trigger output signal 706 may be fed to another switch (in the form of external trigger input signal 705 for that particular switch), some monitoring apparatus, and/or any other appropriate destination. The external trigger output signal 706 is also fed back (in active-high form) to the logic analysers 201 on the same switch 26 as the trigger input 945 (see FIG. 11). This permits a trigger event in one logic analyser on switch 26 to cause a trigger input to another logic analyser on switch 26.

Returning to FIG. 11, a packet on data bus 902 is received not only by logic unit 940 but also by multiplexer 920. The multiplexer 920 extracts selected data from the packet, and combines it with a timestamp from timer unit 930. The output from multiplexer 920 is then written as snooped packet data 921 into snoop RAM 910. The format of snooped packet data 921 in accordance with one embodiment of the invention is indicated in Table 3 below.

TABLE 3

| 3 | 2 | 1 | 0 |
|---|---|---|---|
| SLID or SL | SLID or VL | SLID | DLID or VL | DLID or SL | DLID |
| OpCode | Destination QP or (SE, M, Pad, Tver + PKey) | | |
| Timer | Packet Sequence Number | | |

The snooped packet data comprises a total of 96 bits. (Note that the numbers across the top row of Table 3 denote bytes rather than bits). As with Table 1, the particular fields shown in Table 3 are again derived from the Local Route Header (LRH) and the Base Transport Header (BTH) of an Infiniband packet, and accordingly will be well-known to the person of ordinary skill in the art.

In the embodiment shown in Table 3, there is some flexibility as to the format of snooped packet data 921. The exact contents of the information that is stored into snoop RAM 910 can be configured by appropriate settings of the control registers 970. In particular, the user can chose between storing destination queue pair (QP) information or storing partition key (PKey) plus certain other data. In addition, a range of combinations are possible regarding SLID, DLID, SL and VL, including:

(a) full (16-bit) SLID and DLID, but no SL or VL information
(b) full DLID, SL, plus reduced (12-bit) SLID
(c) reduced (12-bit) SLID and DLID, plus SL and VL
(d) full SLID, reduced (8-bit) DLID, plus SL and VL.

Further possible combinations for these four fields will be apparent to the skilled person from Table 3.

The data structure of Table 3 includes an 8-bit time value received from timer 930. In one embodiment, timer 930 is implemented as a 24-bit timer, and can be configured by an appropriate setting in control registers 970 to provide one of four different outputs, as specified in Table 4 below.

TABLE 4

| Bits | Resolution | Maximum |
|---|---|---|
| [7:0] | 4 ns | 1 μs |
| [12:4] | 64 ns | 16.4 μs |
| [15:8] | 1.02 μs | 262 μs |
| [23:16] | 262 μs | 67.1 ms |

Note that the best resolution of 4 ns reflects the clock speed (250 MHz) of switch ASIC 26, and corresponds to 16 bits of data at a data transmission rate of 2.5 GHz.

In one embodiment, the 8-bit output from timer 930 is arranged to stop at its maximum value (i.e. it does not recycle back through zero). This avoids any uncertainty regarding a timer value as to whether or not the clock has cycled. The mechanism for resetting (or setting) the timer is discussed in more detail below.

One embodiment of logic analyser 201 supports two other formats for snooped packet data 921 apart from that shown in Table 3 (although it is expected that the Table 3 format will be utilised in most circumstances). In one of these formats, the multiplexer 920 simply extracts the first 96 bits of the packet on data bus 902 (subject to an appropriate trigger, as discussed above) for storage into RAM 910. The other format is for handling partition key faults, as may be indicated by port error 901, which is performed in accordance with the Infiniband specification.

Multiplexer 920 outputs data into snoop RAM 910, which provides 64×32 (=2048) bits of storage (other embodiments may use a different size of RAM, or some other suitable form of memory). Snoop RAM 910 is operated as a ring buffer, and can hold snooped data from 21 packets (having the format shown in Table 3) before starting to overwrite itself. Data can be read out from the snoop RAM 910 via an attribute access bus 851.

Figure 13:
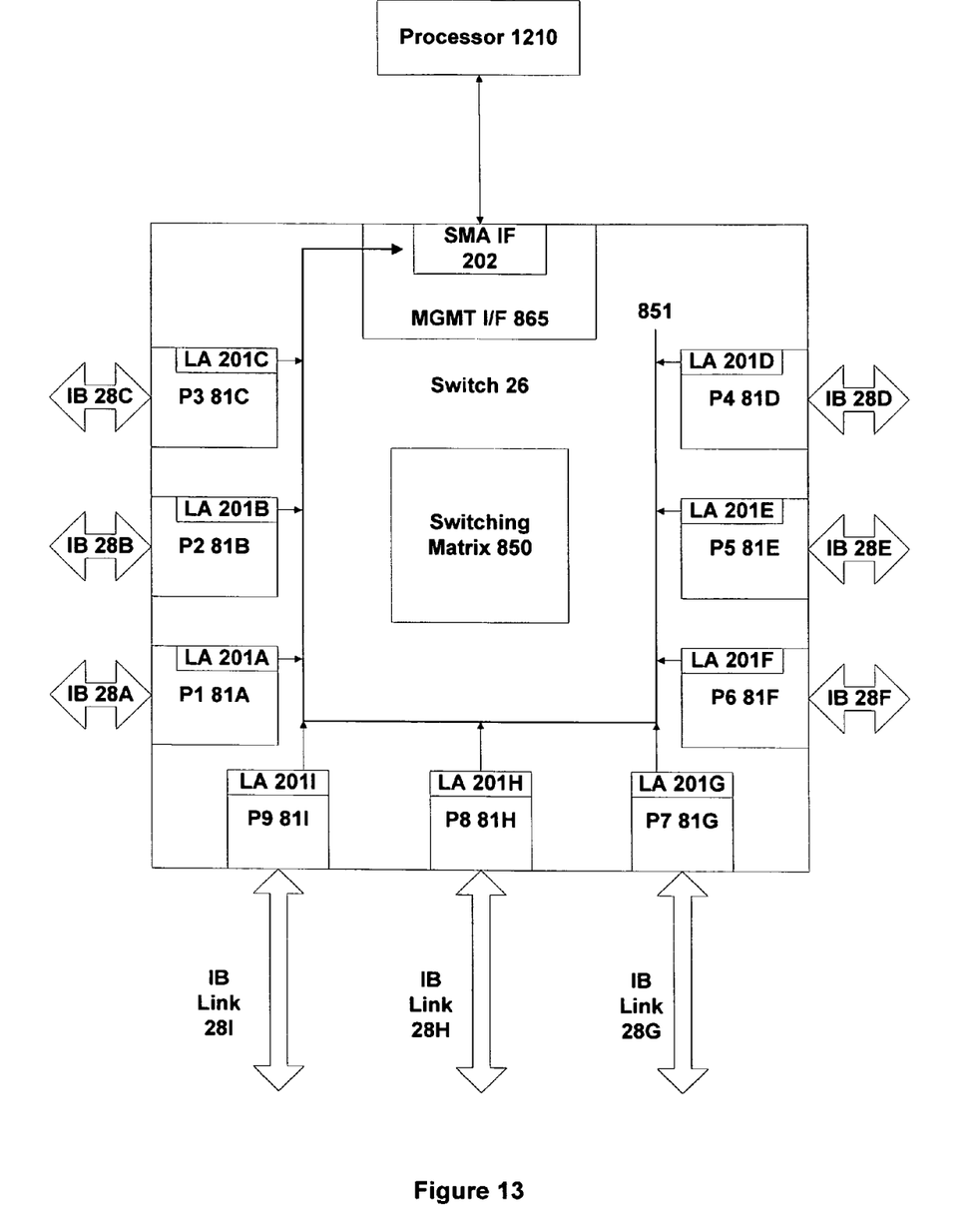
FIG. 13 is a schematic block diagram showing outputs from the logic analysers for the switch of FIG. 10 in accordance with one embodiment of the invention.

The configuration of attribute bus 851 across the chip as a whole is shown in more detail in FIG. 13. The attribute bus allows off-chip access to the contents of the snoop RAM 910 of each logic analyser 201 via the SMA IF 202. Note that processor 1210 in FIG. 13 will generally represent some diagnostic system that is being used to test or monitor switch 26.

In one embodiment, the logic analyser supports various modes of snooping as set out in Table 5 below. The particular mode of snooping in effect at any given time is determined by the setting of the control registers 970. Note that for all of these modes (except mode 111), two events are specified, denoted in Table 3 as event 1 and event 2. Each event is specified in terms of a pair of data structures, namely a comparison test pattern, as illustrated in Table 1, plus an associated mask, as illustrated in Table 2.

TABLE 5

| Mode | Event 1 | Event 2 |
|---|---|---|
| 000 | Trig1 | SQ2 |
| 001 | Trig1 | Trig2 |
| 010 | TrigArm | Trig2 |
| 011 | TrigArm | Trig2 |
| 100 | SQ1 | SQ2 |
| 111 | N/A | N/A |

For all modes, prior to logic unit 940 triggering, multiplexer 920 writes snooped packet data 921 continuously into snoop RAM 910. This data is then overwritten every 21 (and a bit) packets in view of the limited capacity of RAM 910. When logic unit 940 does receive a trigger signal, the response depends upon the selected mode of operation.

Figure 14:
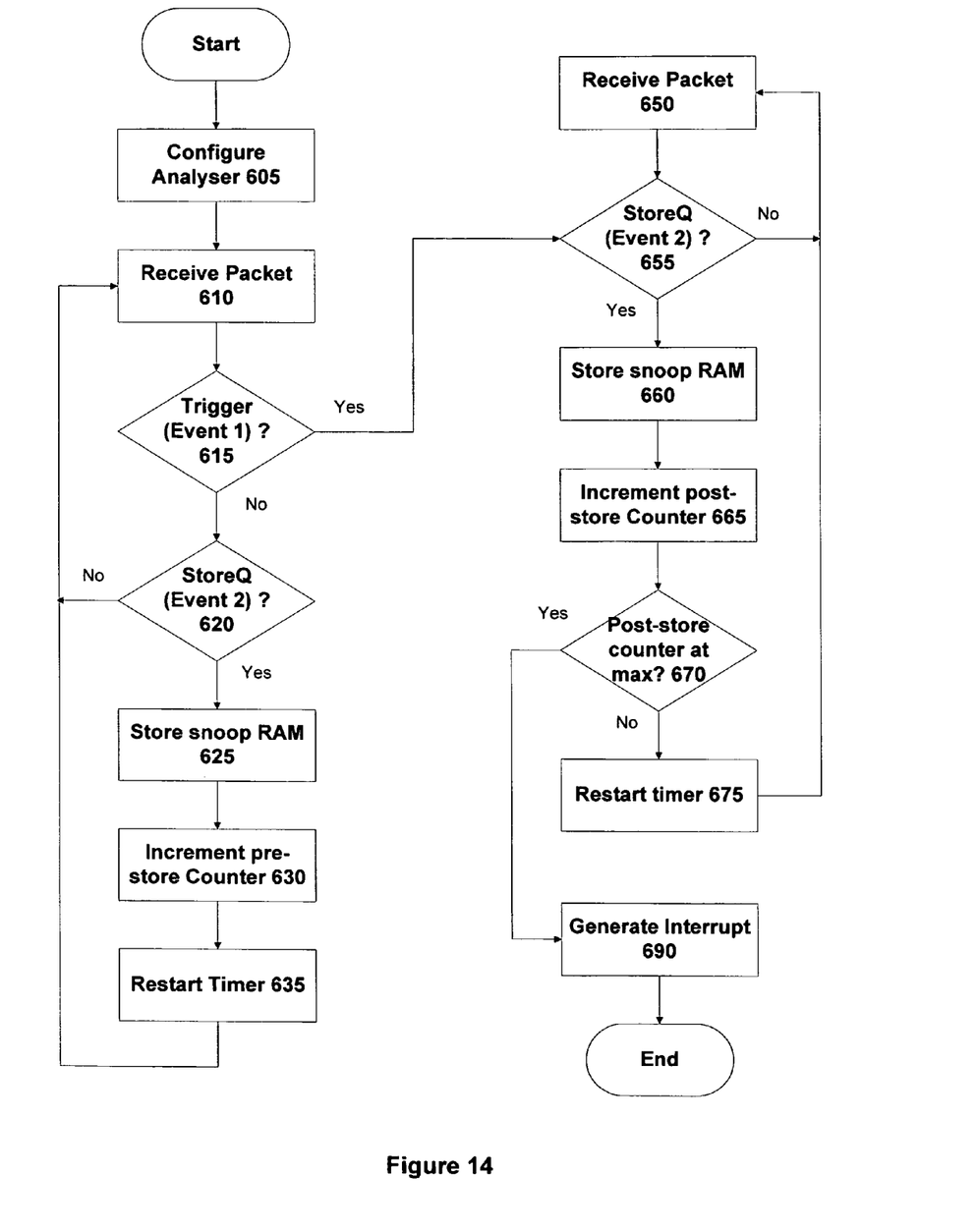
FIG. 14 is a flowchart illustrating one mode of packet snooping using the logic analyser of FIG. 11 in accordance with one embodiment of the invention.

FIG. 14 provides a flowchart illustrating the operations of logic analyser in mode 000 from Table 5. This commences configuring the analyser (605), for example by specifying the comparison test patterns to be used for event 1 and event 2, the fields of the output data, and so on.

The analyser 200 now receives an incoming or outgoing data packet (610) and a test is made to determine if the received packet causes a trigger event (615). In other words, the logic unit 940 receives the packet on data bus 902 and determines whether the packet conforms to the comparison test pattern and mask (as per Tables 1 and 2) specified for event 1. (N.B. the trigger might also be caused, for example, by a trigger input on line 945).

If the incoming packet does not represent a trigger event, then processing continues to operation 620, where a test is made to determine if the packet causes a store qualifier event. Thus logic unit 940 determines whether the received packet conforms to the comparison test pattern and mask (as per Tables 1 and 2) specified for event 2. If the packet is not a store qualifier event, then processing returns to operation 610 to await receipt of the next packet.

If the test at operation 620 is positive, so that the incoming packet is store qualified, then logic unit 940 forwards the store qualifier signal 942 to the store controller 950. The store controller 950 responds to the store qualifier signal 942 by incrementing a pre-store counter 955 (630). In addition, the store controller 950 sends a write-enable signal 952 and an address signal 951 to snoop RAM 910. The store controller 950 increments the address signal 951 for each new write access, thereby operating snoop RAM 910 as a ring buffer. As in a standard ring buffer, when the buffer becomes full, new data will overwrite the oldest data in circular fashion. The write enable signal 952 causes the snooped packet header data 921 to be stored in snoop RAM 910 (625). The stored snooped packet header data includes a time value from timer 930, as described above in relation to Table 4.

The store qualifier signal 942 from logic unit 940 also goes to timer 930. This causes a reset (restart) of timer 930 (635). The effect of this is that the time value stored with a packet in snoop RAM 910 reflects the time since the previously stored packet.

Processing now loops back to operation 610 to await the next packet. If this is not a trigger event (i.e., the outcome at operation 615 is negative), then it will be handled as discussed above. On the other hand, assuming that the incoming packet does represent a trigger event (i.e., the outcome at operation 615 is positive), then we now proceed to test whether the packet is also a store qualifier event (655). This test can be performed in the same manner described above for operation 620. If the incoming packet is not a store qualifier event, then we return to operation 650 to await the next packet.

On the other hand, if the incoming event is store qualified, then logic unit 940 outputs a store qualifier signal 942, and the snooped packet data is stored into snoop RAM 910 (660). Note that this storage can be performed in the same manner as described above for operation 625. In addition, if the received packet represents a store qualifier event, then a post-store counter 956 in store controller 950 is incremented (665). In other words, for each store qualified event, store controller 950 increments the pre-store counter 955 if a trigger (i.e., event 1) has not yet occurred, and the post-store counter 956 after the trigger has occurred.

The store controller 950 now tests the post-store counter 956 against a maximum store value which is specified in the control registers 970 of the logic analyser (670). If the counter has reached the maximum specified value, then store controller 950 generates an interrupt 953 (690). This interrupt is passed to processor 1210 (see FIG. 12) and is used to signal the completion of snooping. Once interrupt 953 has been raised, the contents of snoop RAM 910 are frozen for subsequent access over bus 911 and appropriate analysis (i.e., any further store qualifier events are ignored).

If the store counter is not at the specified maximum, then timer 930 is (re)started (675). Processing now returns to operation 650, waiting for another packet. This loop then continues until the maximum specified number of store qualifier signals has been received, whereupon the test at operation 670 will be positive, as described above.

In the embodiment shown, a single packet can generate both event 1 then event 2, by giving a positive outcome at operation 615 and then also at operation 655.

In another embodiment however, a positive outcome from operation 615 might lead directly to operation 650 (receipt of another packet), in which case event 2 could arise from the packet immediately after the packet producing event 1 (but not from the same packet). Note that in either embodiment there may be multiple packets from receipt of a trigger at operation 610 until a store qualifier packet is received at operation 655.

It will be appreciated that the effect of operations 635 and 675 is that the snooped packet data 621 for each store qualified packet contains the elapsed time since the previously store qualified packet. In one embodiment, the time value for the very first packet stored into snoop RAM 910 is zero, since the timer has not previously been set. However, in other embodiments the timer 930 could be initially started at various other points, such as for the very first received packet at operation 610, for a positive trigger outcome at operation 615, and so on.

Depending on the interval between successive store qualifiers, and also on the selected resolution of the timer (see Table 4), the 8-bit output from timer 930 may reach its maximum value prior to the next store qualifier being received. In this case, the timer will provide this maximum value to the multiplexer 920 for storage in snoop RAM 910, as previously described.

In one embodiment, the maximum store value can be set in the range from 1-21. If this value is set at 21, then at completion (i.e., after operation 690), the snoop RAM 910 contains the snooped packet data for each of the store qualifier events since the trigger was detected (at operation 615). If the maximum store value is set at less than 21, then at completion the snoop RAM 910 will contain snooped packet data for the relevant store qualifier events, plus any snooped packet data prior to the trigger—i.e., as stored at operation 625.

The number of pre-trigger events stored in snoop RAM 910 is given by pre-store counter 955, and the number of post-trigger events stored in snoop RAM 910 is given by the post-store counter 956. Note that if the combined total of pre-store counter 955 plus post-store counter 956 exceeds 21 (the capacity of the snoop RAM), then the earliest pre-trigger events will have been overwritten leading up to the initial trigger of operation 610. For example, if the maximum stored value is set at 12, at completion the snoop RAM 910 will hold snooped packet data for 9 packets leading up to the trigger, plus the first 12 store qualifier events after the trigger is received.

Mode 100 in Table 5 is similar to mode 000 as just described, except that no initial trigger is required. This can be modelled in the flowchart of FIG. 14 by assuming that the test at operation 615 is always positive (i.e., processing always branches to operation 655). In addition, in mode 100 two different store qualifiers can be specified for events 1 and 2. If either one (or both) of these events is detected by logic unit 940, then a store qualifier is generated, leading to the storage of snooped packet data and incrementing the post-store counter (corresponding to operations 660 and 665 in FIG. 14). Processing completes when the total number of store qualified packets (for event 1 together with event 2) reaches the maximum number (corresponding to operations 670 and 690 in FIG. 14).

Mode 001 in Table 5 is similar to mode 000, except that once the trigger is enabled, it is assumed that each of the following packets is store qualified (rather than this being conditional on event 2 occurring). In other words, it is assumed that the test at operation 655 in FIG. 14 always yields a positive result. Mode 001 can therefore be used to store snooped header data for the N packets immediately after a trigger event, where N is determined by the maximum store counter setting. Mode 001 also permits two different trigger events to be specified to initiate such a sequence. Therefore snooped header data is stored following the occurrence of event 1 and/or event 2.

Modes 010 and 011 in Table 5 are similar to mode 001, but with a more complicated trigger arrangement. Thus, in modes 010 and 011, event 1 corresponds to trigger arming, which can be regarded as enabling the trigger of event 2. In other words, event 2 does not lead to a trigger unless the trigger arming of event 1 has already occurred. More particularly, in mode 010, the system triggers on event 2 only if event 2 occurs exactly N packets after the trigger arming of event 1, while in mode 011, the system triggers on event 2 only if event 2 occurs at least N packets after the trigger arming of event 1. The value of N is set by the user in the control registers 970, and in one embodiment lies in the range 1-7.

After triggering on event 2 in mode 010 or 011, the logic analyser then continues as described above for a trigger event in mode 001. Thus it is assumed that the store qualifier signal 942 is active for all packets following this trigger event, and consequently snoop RAM 910 ends up storing information for a sequence of packets immediately after the trigger event.

The remaining mode in Table 5 corresponds to detection of a partition key fault. As previously mentioned, the behaviour of logic analyser 201 in this circumstance is determined by the Infiniband specification.

Logic analyser 201 generally incorporates various additional control facilities not specifically described so far, such as an external reset facility. This can be used to terminate the processing of FIG. 14, for example, if the maximum number of store qualifiers is never obtained. In addition, processor 1210 is able to access the data that has been written so far into snoop RAM 910 via bus 851. The skilled person will be aware of various other such additional facilities that may be present in logic analyser 201.

Logic analyser 201 is useful for a variety of purposes. It implements certain processing for handling partition key faults as is required by the Infiniband specification. This functionality is then enhanced and extended to provide a user-configurable snoop capability which can be used during initial design, prototyping and testing of switch 26. In addition, the logic analyser can also be used in the field to provide real-time diagnostics of a production system, remote monitoring of chip performance, and so on. Incorporating logic analyser 201 into each port 81 of switch 26 provides great power and flexibility for diagnostics, and allows the operations of switch 26 to be investigated at a much more detailed and sophisticated level than is normally possible with conventional external logic analysers, but without interfering with communications over the network. At the same time, logic analyser 201 is highly compact, and so consumes little in the way of real estate and other resources on switch 26 (especially since the ability to monitor packets for partition key faults is already required by the Infiniband specification to be present).

In conclusion, a variety of particular embodiments have been described in detail herein, but it will be appreciated that this is by way of exemplification only. The skilled person will be aware of many further potential modifications and adaptations that fall within the scope of the claimed invention and its equivalents.

The invention claimed is:

1. A communications chip comprising:
    a plurality of ports, each port providing an interface for attachment to an external communications facility to exchange data traffic therewith;
    a switching matrix for routing data traffic on the chip between said plurality of ports;
    a plurality of logic analyzers, each logic analyzer being associated with a corresponding one of said plurality of ports, wherein each logic analyzer monitors data traffic passing through its corresponding port and triggers when one or more predetermined conditions relating to the monitored data traffic occurs;
    a control interface, wherein the control interface configures the predetermined conditions and specifies selected fields of header data from packets of the monitored data traffic to be stored when a predetermined condition occurs;
    a multiplexer for each logic analyzer, wherein the multiplexer extracts the selected fields of header data from the packets of the monitored data traffic; and
    memory in each logic analyzer, wherein each logic analyzer stores in the memory the selected fields of header data extracted from the packets of the monitored data traffic when the logic analyzer is triggered by the predetermined conditions, wherein each logic analyzer stores in the memory the selected field of header data without storing in the memory other header data.

2. The communications chip of claim 1, wherein the memory comprises random access memory (RAM).

3. The communications chip of claim 1, wherein said at least one logic analyzer further includes a timer, and wherein a time value is associated with the stored header data for each of said packets.

4. The communications chip of claim 1, wherein the control interface can be used to specify the maximum number of packets satisfying said one or more predetermined conditions whose header data is stored into the memory.

5. The communications chip of claim 1, wherein said one or more predetermined conditions comprise a packet header matching a comparison bit pattern as configured by said control interface.

6. The communications chip of claim 5, wherein said control interface can be further used to configure a mask to be used in said matching.

7. The communications chip of claim 5, wherein said control interface can be used to specify selected fields of the packet header on which said matching is performed.

8. The communications chip of claim 1, wherein said control interface can be used to select between multiple modes of triggering on said one or more predetermined conditions.

9. The communications chip of claim 1, wherein said logic analyzer triggers on an external trigger signal.

10. The communications chip of claim 9, wherein said external trigger signal may be received from another logic analyzer on the chip.

11. The communications chip of claim 1, wherein the monitored data traffic includes Infiniband traffic.

12. The communications chip of claim 1, wherein the predetermined conditions include at least one of: detecting a packet that includes an incorrect partition key for a virtual lane, detecting an ECC error on incoming data, or detecting an error in packet data.

13. A method of operating a communications chip having a plurality of ports, each port providing an interface for attachment to an external communications facility to exchange data traffic therewith, and a switching matrix for routing data traffic on the chip between said plurality of ports, said method comprising:

providing a plurality of logic analyzers, each logic analyzer being associated with a corresponding one of said plurality of ports;

monitoring with each logic analyzer data traffic passing through its corresponding port;

triggering within the logic analyzer when one or more predetermined conditions relating to the monitored data traffic occur;

configuring the predetermined conditions via a control interface on the communications chip;

specifying, via the control interface, selected fields of header data from packets of the monitored data traffic to be stored when a predetermined condition occurs;

extracting the selected fields of header data from the packets of the monitored data traffic; and storing in memory in each logic analyzer the selected fields of header data extracted from the packets of the monitored data traffic when the logic analyzer is triggered by the predetermined conditions, wherein each logic analyzer stores in the memory the selected field of header data without storing in the memory other header data.

14. The method of claim 13, wherein the memory comprises random access memory (RAM).

15. The method of claim 13, wherein at least one logic analyzer further includes a timer, and said method further comprises associating a time value with the stored header data for each of said packets.

16. The method of claim 13, further comprising using the control interface to specify the maximum number of packets satisfying said one or more predetermined conditions whose header data is stored into the memory.

17. The method of claim 13, wherein said one or more predetermined conditions comprise a packet header matching a comparison bit pattern as configured by said control interface.

18. The method of claim 17, further comprising using said control interface to configure a mask to be used in said matching.

19. The method of claim 17, further comprising using said control interface to specify selected fields of the packet header on which said matching is performed.

20. The method of claim 13, further comprising using said control interface to select between multiple modes of triggering on said one or more predetermined conditions.

21. The method of claim 13, wherein said logic analyzer triggers on an external trigger signal.

22. The method of claim 21, wherein said external trigger signal is received from another logic analyzer on the chip.

23. The method of claim 13, wherein said logic analyzer is used for development testing of the communications chip.

24. The method of claim 13, wherein said logic analyzer is used to provide field diagnostics for said communications chip in a production environment.

25. A computer readable medium storing instructions that, when executed by a computer, cause the computer to perform a method of operating a communications chip having a plurality of ports, each port providing an interface for attachment to an external communications facility to exchange data traffic therewith, and a switching matrix for routing data traffic on the chip between said plurality of ports, said method comprising:

providing a plurality of logic analyzers, each logic analyzer being associated with a corresponding one of said plurality of ports;

monitoring with each logic analyzer data traffic passing through its corresponding port;

triggering within the logic analyzer when one or more predetermined conditions relating to the monitored data traffic occur;

configuring the predetermined conditions via a control interface on the communications chip;

specifying via the control interface selected fields of header data from packets of the monitored data traffic to be stored when a predetermined condition occurs;

extracting the selected fields of header data from the packets of the monitored data traffic; and storing in memory in each logic analyzer the selected fields of header data extracted from the packets of the monitored data traffic when the logic analyzer is triggered by the predetermined conditions, wherein each logic analyzer stores in the memory the selected field of header data without storing other header data.

* * * * *